United States Patent
Maruoka

(10) Patent No.: US 8,813,799 B2
(45) Date of Patent: Aug. 26, 2014

(54) HEAVY DUTY RADIAL TIRE

(75) Inventor: Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1059 days.

(21) Appl. No.: 12/652,088

(22) Filed: Jan. 5, 2010

(65) Prior Publication Data

US 2010/0269967 A1    Oct. 28, 2010

(30) Foreign Application Priority Data

Apr. 28, 2009    (JP) .................................. 2009-109789

(51) Int. Cl.
  *B60C 9/18*    (2006.01)
  *B60C 11/04*    (2006.01)
(52) U.S. Cl.
  USPC ............... 152/209.18; 152/209.27; 152/538
(58) Field of Classification Search
  USPC ................ 152/209.18, 209.27, 538
  See application file for complete search history.

(56) References Cited

U.S. PATENT DOCUMENTS

| 5,660,654 | A | * | 8/1997 | Miyazaki | 152/538 |
| 5,772,807 | A | * | 6/1998 | Fourgon | 152/209.5 |
| 7,036,541 | B2 | | 5/2006 | Maruoka et al. | |
| 8,225,835 | B2 | * | 7/2012 | Harikae | 152/536 |
| 2008/0047643 | A1 | * | 2/2008 | Takahashi | 152/209.26 |
| 2008/0128063 | A1 | * | 6/2008 | Ohara | 152/209.19 |

FOREIGN PATENT DOCUMENTS

| EP | 849100 A1 | * | 6/1998 |
| JP | 63-134313 A | * | 6/1988 |
| WO | WO-2008/090680 A1 | * | 7/2008 |

OTHER PUBLICATIONS

Translation for Japan 63-134313 (no date).*

* cited by examiner

*Primary Examiner* — Steven D Maki

(74) *Attorney, Agent, or Firm* — Birch, Stewart, Kolasch & Birch, LLP.

(57) ABSTRACT

A heavy duty radial tire comprises a tread portion divided into four or five circumferential ribs and a tread reinforcing belt including a maximum width belt ply. The width Bw of the maximum width belt ply is 0.90 to 0.98 times the tread width Tw. The contour shape of the tire footprint has a ground contacting length CB at a 70% width position and a ground contacting length CC at a 97% width position, wherein the ratio CB/CC is 1.00 to 1.06. In a tread edge near region J, (1) the axially outermost shoulder rib is provided with no circumferential groove having a width of less than 5 mm, and a ratio Rs/Rc of an axial width Rs of the shoulder rib to an axial width Rc of a center rib is 1.25 to 1.45, or (2) the shoulder rib is provided with a narrow circumferential groove having a width of less than 5 mm to divide the shoulder rib into an axially inner main portion and an axially outer narrow portion, and a ratio Rs1/Rc of an axial width Rs1 of the axially inner main portion to an axial width Rc of a center rib is 1.25 to 1.45.

2 Claims, 6 Drawing Sheets

HEAVY DUTY RADIAL TIRE

BACKGROUND OF THE INVENTION

The present invention relates to a pneumatic tire, more particularly to a structure of the tread portion of a heavy duty radial tire having a four or five-rib tread pattern capable of reducing uneven wear.

In the long-route highway express buses traveling under the almost full load capacity, widely used are radial tires having rib type tread patterns in view of their low fuel consumption and low noise natures.

In the case of the rib-pattern radial tires used in such long-route highway express buses, there is a problem with the front tires such that the axially outermost shoulder ribs are worn largely and rapidly when compares with the other ribs such as center rib because the center of gravity of the vehicle body is relatively high and the rolling of the vehicle body during running is relatively large, and the front tires are subjected to large lateral acceleration and further braking force during running.

In order to prevent such uneven wear and rapid wear in the shoulder ribs (hereinafter, collectively, the "shoulder wear"), a conventionally employed technique is to increase the ground pressure in the tread shoulder regions in order to lessen slippage between the shoulder ribs and road surface so that wear of the shoulder ribs are reduced.

However, this conventional technique can not fully resolve the problem of the shoulder wear occurring on the front tires of the long-route highway express buses.

SUMMARY OF THE INVENTION

It is therefore, an object of the present invention to provide a heavy duty radial tire, in which the above-mentioned shoulder wear can be effectively reduced by limiting the width of a belt ply, the contour shape of the footprint, and the widths of ribs in specific ranges to reduce the slippage between the shoulder ribs and road surfaces.

According to the present invention, a heavy duty radial tire comprises a tread portion having a tread width Tw between tread edges, a pair of sidewall portions, a pair of bead portions each with a bead core therein, a carcass comprising at least one carcass ply made of steel cords extending between the bead portions through the tread portion and sidewall portions, and a belt disposed radially outside the carcass in the tread portion and comprising at least two plies of steel cords including a maximum width belt ply, wherein the tread portion is provided with three or four circumferential main grooves extending straight in the tire circumferential direction and having a groove width of not less than 5 mm so that the tread portion is divided into four or five circumferential ribs which are (A) a pair of axially outer most shoulder ribs, one center rib disposed on the tire equator, and a pair of middle ribs one on each side of the center rib, or (B) a pair of axially outer most shoulder ribs, and a pair of center ribs disposed one on each side of the tire equator, a ratio Bw/Tw of a width Bw of the maximum width belt ply to the tread width Tw is 0.90 to 0.98, a ratio CB/CC of a ground contacting length CB to a ground contacting length CC of the contour shape of a footprint is 1.00 to 1.06, wherein the ground contacting length CB is a circumferential length of the contour shape of the footprint measured at a 70% width position which is defined as being spaced apart from the tire equator by 70% of a half ground contacting width CTw which is ½ of the axial width of the contour shape of the footprint, and the ground contacting length CC is a circumferential length of the contour shape of the footprint measured at a 97% width position which is defined as being spaced apart from the tire equator by 97% of the half ground contacting width CTw, in a tread edge near region defined between the tread edge and a plane parallel to the tire equatorial plane at the axial edge of the maximum width belt ply, (1) the shoulder rib is provided with no circumferential groove having a width of less than 5 mm, and a ratio Rs/Rc of an axial width Rs of the shoulder rib to an axial width Rc of the center rib is 1.25 to 1.45, or (2) the shoulder rib is provided with a narrow circumferential groove having a width of less than 5 mm to divide the shoulder rib into an axially inner main portion and an axially outer narrow portion, and a ratio Rs1/Rc of an axial width Rs1 of the axially inner main portion to an axial width Rc of the center rib is 1.25 to 1.45.

Preferably, the maximum width belt ply has a ply strength index $(G=S \times E/W)$ of from 1.2 to 1.6, wherein the ply strength index is the ply strength $S \times E$ divided by the standard tire load W in kN for the tire, and the ply strength $S \times E$ is the product of the tensile rupture strength S in kN of one belt cord multiplied by the cord count E of the belt cords per 5 cm width of the ply.

Definitions

The tread width Tw is the axial distance between the tread edges Te measured in a normally inflated unloaded condition of the tire.

The tread edges Te are the axial outermost edges of the ground contacting region of the tire (camber angle=0) in a normally inflated loaded condition.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load W.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load W are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard tire load W is the "maximum load capacity" in JATMA, the "Load Capacity" in ETRTO, the maximum value given in the above-mentioned table in TRA or the like.

The footprint basically refers to that obtained under the normally inflated loaded condition at the tire camber angle of zero, but, in practice, since the footprint varies as the tire rotates due to the existence of tread grooves, especially axial grooves, the average shape of the footprint obtained by rotating the tire 360 degrees is usually used. Therefore, the contour shape of the footprint basically refers to the average shape of the footprint.

In this application, various dimensions, positions and the like of the tire refer to those under the normally inflated unloaded condition of the tire unless otherwise noted.

The widths of the tread grooves such as circumferential main grooves and narrow circumferential grooves, the widths Rs, Rc of the circumferential ribs, and the width Rs1 of the shoulder rib main portion refer to those measured at the tread surface under the normally inflated unloaded condition of the tire.

DESCRIPTION OF THE PREFERRED EMBODIMENTS

Embodiments of the present invention will now be described in detail in conjunction with accompanying drawings.

Figure 1:
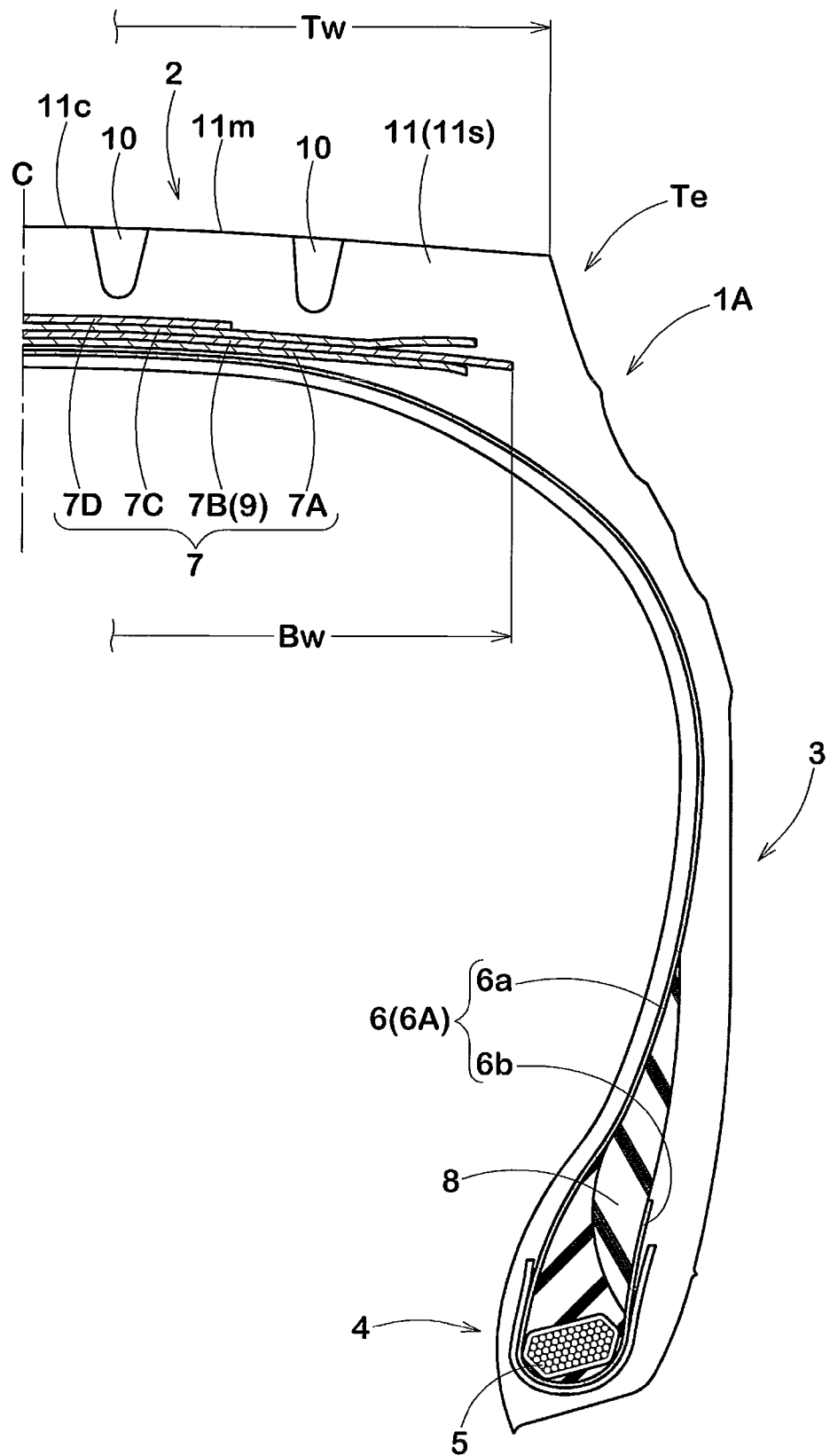
FIG. 1 is a cross sectional view of a heavy duty radial tire having a five-rib tread pattern according to the present invention.

In FIG. 1 showing a first embodiment of the present invention, heavy duty radial tire 1A comprises a tread portion 2, a pair of sidewall portions 3, a pair of bead portions 4 each with a bead core 5 therein, a carcass 6 extending between the bead portions 4 through the tread portion 2 and sidewall portions 3, and a tread reinforcing belt 7 disposed radially outside the carcass 6 in the tread portion 2.

The heavy duty radial tire 1A is a radial tire suited for a long-distance highway express bus.

The carcass 6 is composed of at least one ply 6A (in this example, a single ply 6A) of steel cords arranged radially at an angle of from 75 to 90 degrees with respect to the tire circumferential direction. The carcass ply 6A extends between the bead portions 4 through the tread portion 2 and sidewall portions 3, and is turned up around the bead core 5 in each of the bead portions from the inside to the outside of the tire so as to form a pair of turned up portions 6b and a main portion 6a therebetween.

Between the main portion 6a and each of the turned up portions 6b, there is disposed a bead apex rubber 8 extending radially outwardly from the bead core 5 in a tapered manner.

The belt 7 is composed of at least two cross plies (usually three or four plies including two cross plies) of parallel steel cords laid at an angle of from 10 to 70 degrees with respect to the tire circumferential direction.

The belt 7 in this example is composed of: a radially innermost first belt ply 7A made of steel cords laid parallel each other at an angle in a range of from 50 to 70 degrees with respect to the tire circumferential direction; and radially outwardly arranged second, third and fourth belt plies 7B, 7C and 7D each made of steel cords laid parallel each other at an angle in a range of from 15 to 30 degrees with respect to the tire circumferential direction.

With respect to the tire equator C, the cords of the first belt ply 7A and the second belt ply 7B are inclined oppositely to the cords of the third belt ply 7C and the fourth belt ply 7D.

In this example, the second belt ply 7B is the maximum width belt ply 9 which is widest among the belt plies 7A-7D.

The widths of the first and third belt plies 7A and 7C are set to be 5 to 10 mm smaller than the maximum width belt ply 9 in order to lessen stress concentration on belt ply edges.

The fourth belt ply 7D is the minimum width belt ply having a function to protect the first to third belt plies 7A to 7C.

In order to reduce the shoulder wear in the shoulder ribs 11s, the ratio Bw/Tw of the width Bw of the maximum width belt ply 9 to the tread width Tw is limited in a range of from 0.90 to 0.98.

Figure 2:
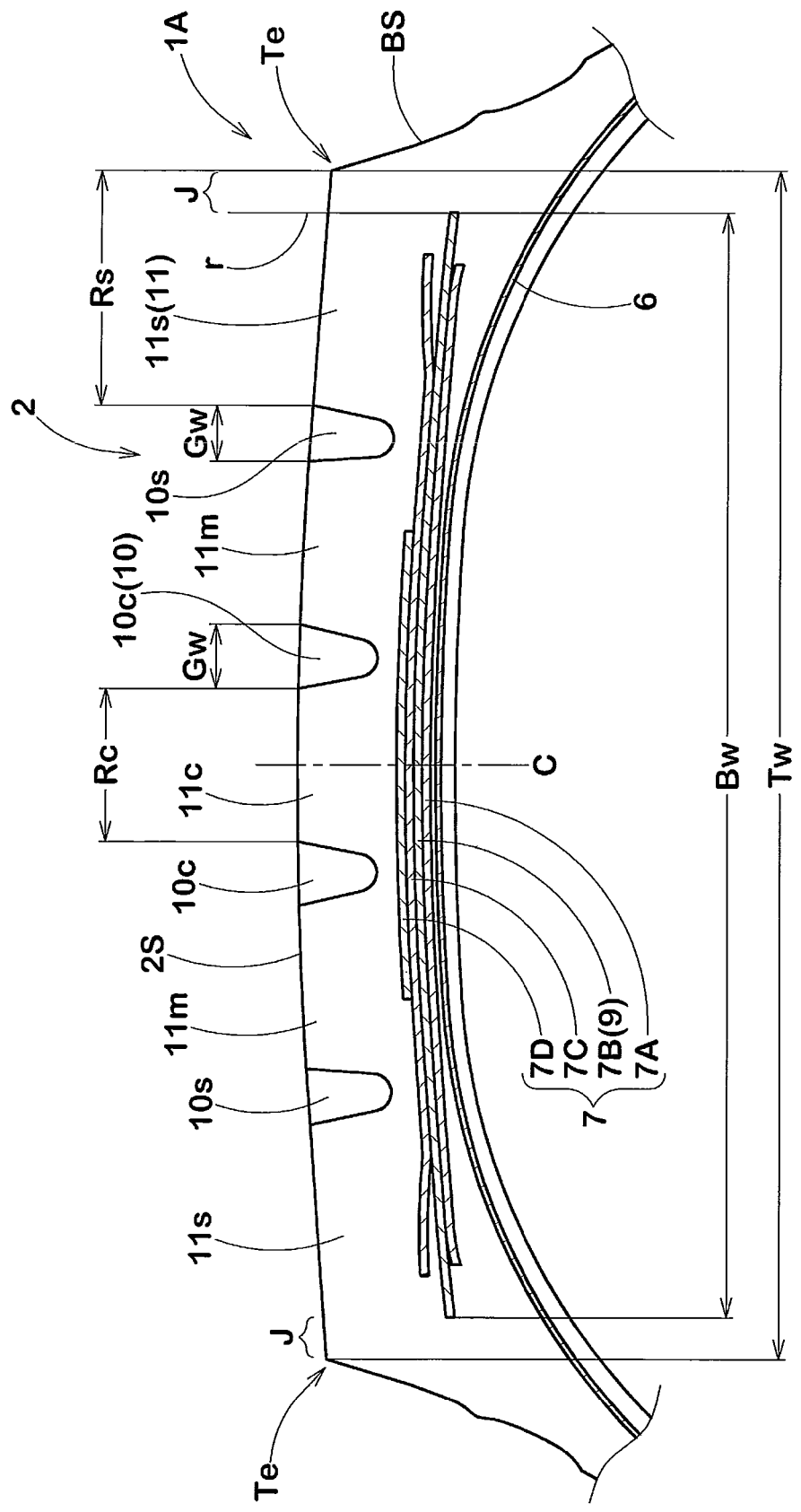
FIG. 2 is a cross sectional view of the tread portion thereof.
Figure 3:
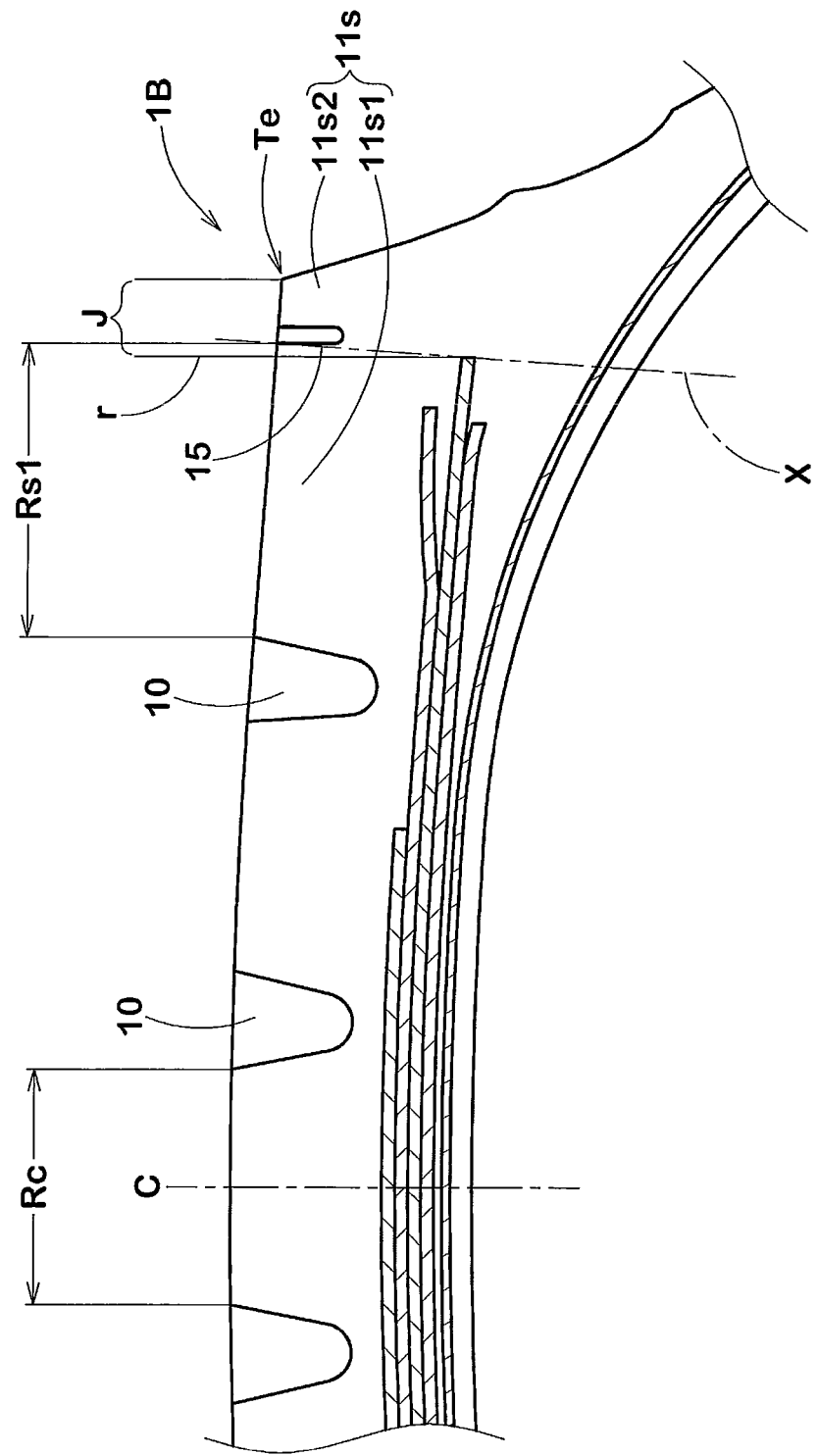
FIG. 3 is a cross sectional view of a part of the tread portion of a heavy duty radial tire having a five-rib tread pattern according to the present invention.
Figure 4:
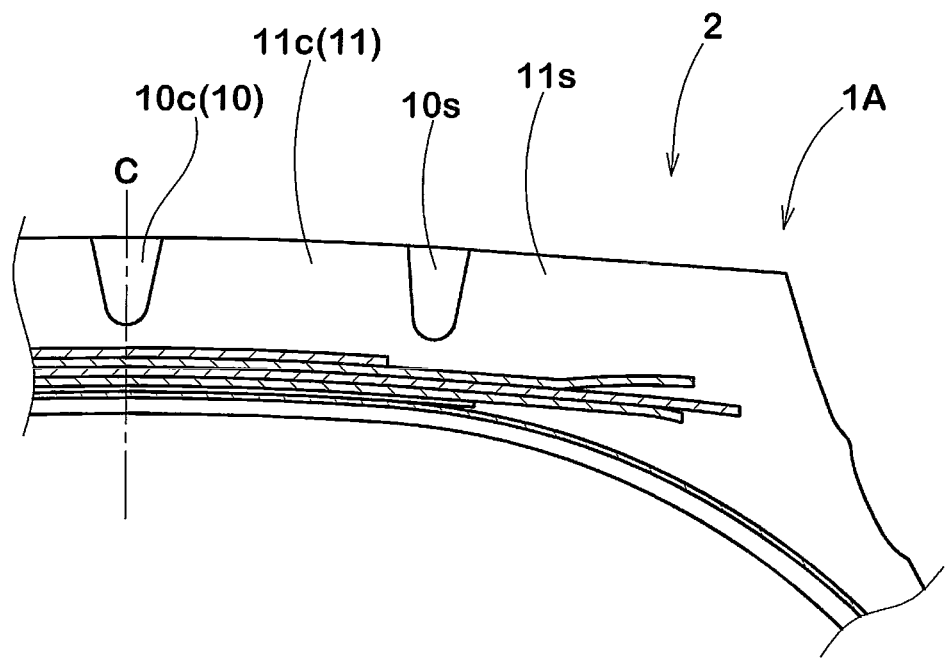
FIG. 4 is a cross sectional view of a part of the tread portion of a heavy duty radial tire having a four-rib tread pattern according to the present invention.
Figure 5:
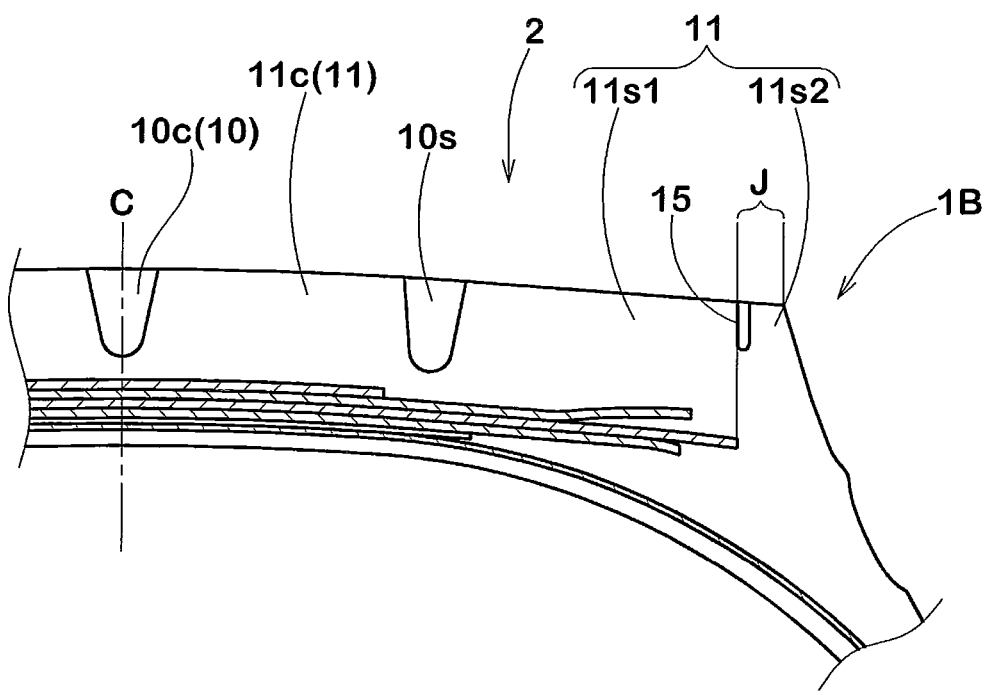
FIG. 5 is a cross sectional view of a part of the tread portion of a heavy duty radial tire having a four-rib tread pattern according to the present invention.

In order to improve running stability during straight running and achieve low fuel consumption and low noise, while securing necessary wet grip performance, the tread portion 2 is provided with a rib-type tread pattern comprising three or four circumferential main grooves 10 extending continuously in the tire circumferential direction, therefore, the tread portion 2 is divided into four or five circumferential ribs 11, namely, (A) a pair of axially outermost shoulder ribs 11s, one center rib 11c on the tire equator and a pair of middle ribs 11m one on each side of the center rib 11c as shown in FIGS. 1, 2 and 3, OR (B) a pair of axially outermost shoulder ribs 11s and a pair of center ribs 11c disposed one on each side of the tire equator as shown in FIGS. 4 and 5.

For example, in the embodiment shown in FIG. 2, the circumferential main grooves 10 are a pair of axially inner circumferential main grooves 10c disposed one on each side of the tire equator C, and a pair of axially outer circumferential main grooves 10s, thereby the tread portion 2 is divided into the center rib 11c, middle ribs 11m and shoulder ribs 11s. Each of the circumferential main groove 10 is a circumferentially continuously extending straight groove having a groove width Gw of not less than 5 mm, therefore, the tread pattern rigidity can be maintained high and good drainage can be obtained.

It is preferable for the drainage and tread pattern rigidity that the width Gw of the circumferential main groove 10 is set to be not more than 17.0 mm, and the depth of the circumferential main groove 10 is set in a range of from 13.0 to 17.0 mm.

In a tread edge near region J, which is defined between the tread edge Te and a plane (r) being parallel with the tire equatorial plane C and positioned at the axially outer edge of the maximum width belt ply 9, the shoulder ribs 11s of the embodiments shown in FIGS. 2 and 4 are provided with no circumferential groove having a groove width of less than 5 mm. And the ratio Rs/Rc of the axial width Rs of the shoulder rib 11s to the axial width Rc of the center rib 11c is limited in a range of from 1.25 to 1.45 in order to reduce the shoulder wear in the shoulder rib 11s.

Further, according to the present invention, the contour shape of the footprint K is limited as follows in order to control the shoulder wear in the shoulder ribs 11s.

Figure 6:
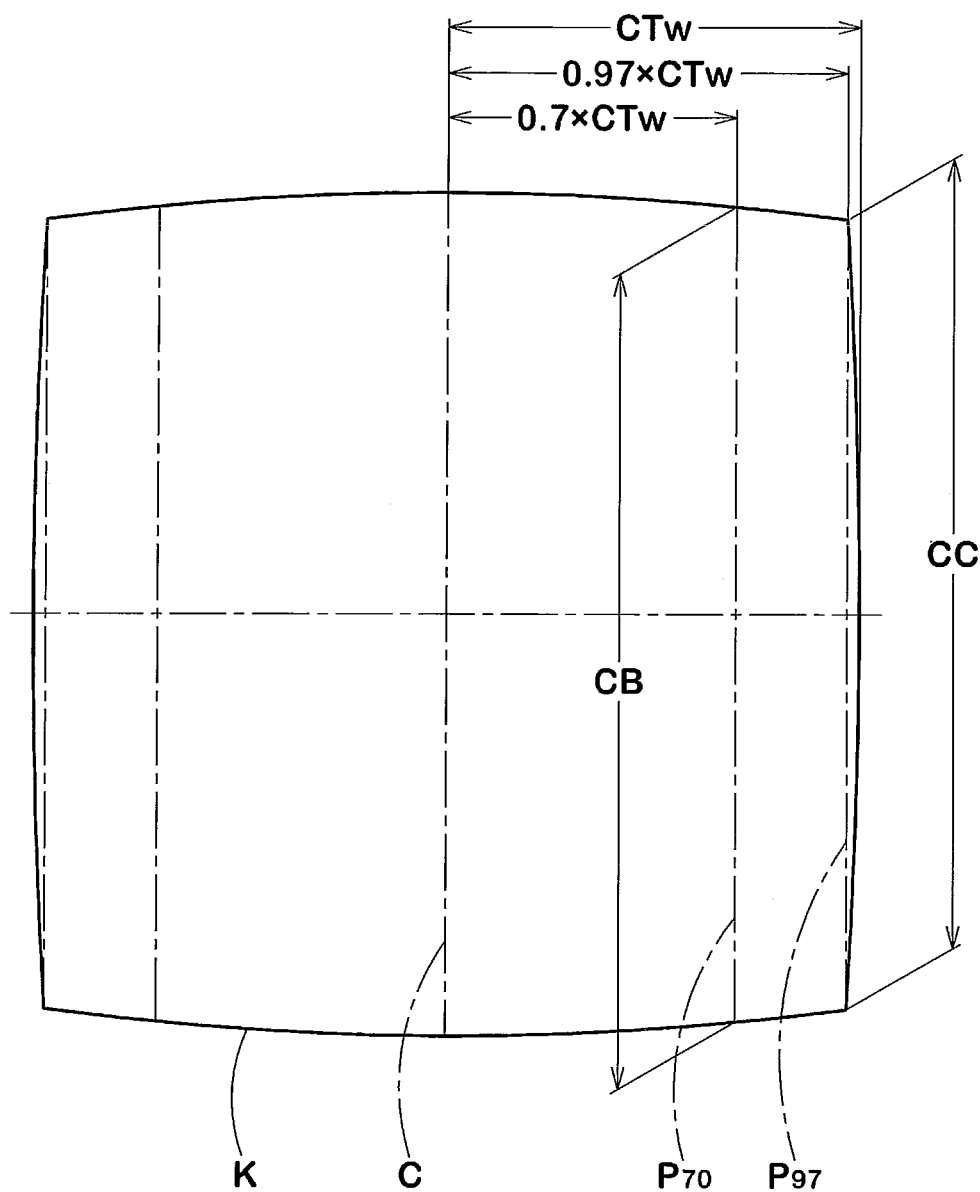
FIG. 6 is a diagram for explaining the contour shape of the footprint of the tire.
Figure 7:
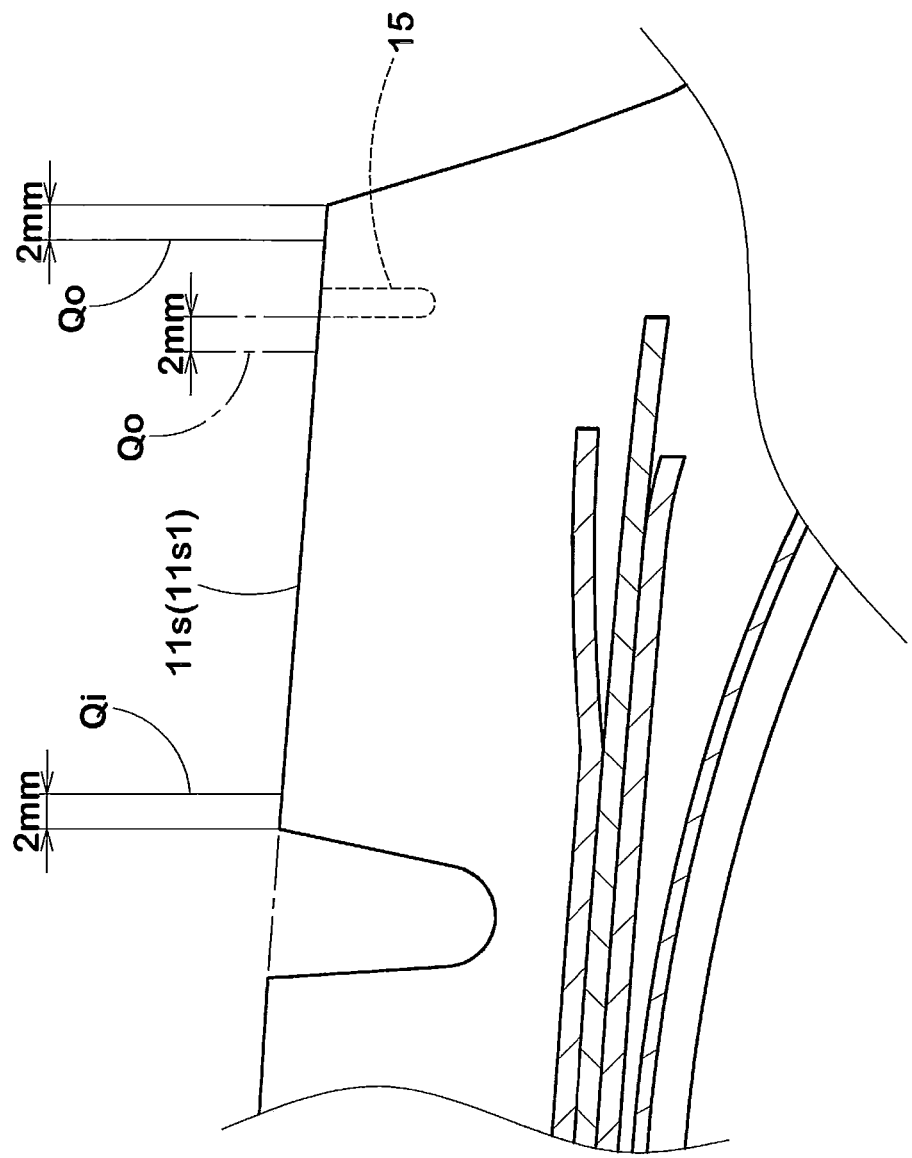
FIG. 7 is a diagram for explaining the measuring positions of uneven wear in the undermentioned comparison tests.

As shown in FIG. 6 which shows a typical contour shape of the footprint K from which tread grooves are omitted, the ratio CB/Cc of the ground contacting length CB to the ground contacting length CC is limited in a range of from 1.00 to 1.06.

The ground contacting length CB is the circumferential length of the contour shape of the footprint K measured at a 70% width position P70.

The ground contacting length CC is the circumferential length of the contour shape of the footprint K measured at a 97% width position P97.

The 70% width position P70 is spaced apart from the tire equator C by an axial distance (0.7×CTw) of 70% of a half ground contacting width CTw.

The 97% width position P97 is spaced apart from the tire equator C by an axial distance (0.97×CTw) of 97% of the half ground contacting width CTw.

The half ground contacting width CTw is ½ of the maximum axial width of the contour shape of the footprint K.

It becomes possible to control the shoulder wear in the shoulder rib 11s at high levels by (1) limiting the ratio CB/CC within the range of from 1.00 to 1.06, (2) limiting the ratio Bw/Tw within the range of from 0.90 to 0.98 and (3) limiting the ratio Rs/Rc within the range of from 1.25 to 1.45 as described above.

More specifically, by limiting the ground contacting length ratio CB/CC within the range of from 1.00 to 1.06, the ground contacting length is equalized and the difference in the dynamic loaded radius of the tire is decreased. Thereby, slippage between the shoulder ribs 11s and the road surface resulting from the difference in the dynamic loaded radius can be lessened.

If the ratio CB/CC is more than 1.06, the dynamic loaded radius is decreased near the tread edge Te and the slippage between the road surface increases.

If the ratio CB/CC is less than 1.00, the ground pressure of the shoulder ribs 11s becomes excessively increased, and the wear energy at the time of braking operations increases. As a result, uneven wear occurs in the shoulder ribs 11s.

By limiting the rib width ratio Rs/Rc within the range of from 1.25 to 1.45, the rigidity of the shoulder rib 11s and the rigidity of the center rib 11c are optimized. Thereby, in cooperation with the decrease in the difference in the dynamic loaded radius resulting from the limitation of the ratio CB/CC, the slippage between the road surface and the center rib 11c and shoulder rib 11s can be evened and lessened, and the shoulder wear in the shoulder rib 11s can be reliably and effectively prevented.

If the ratio Rs/Rc is more than 1.45, since the rigidity of the center rib 11c is excessively decreased, the center rib 11c is worn even if the ratio CB/CC is limited as above. If the ratio Rs/Rc is less than 1.25, since the rigidity of the shoulder rib 11s is excessively decreased, the shoulder rib 11s is worn even if the ratio CB/CC is limited as above. In either case, uneven wear is caused.

By limiting the ratio Bw/Tw within the range of from 0.90 to 0.98, the rigidity of the shoulder rib 11s can be evened across the entire width of the rib, and the rigidity of the shoulder rib 11s and the rigidity of the center rib 11c are optimized.

If the ratio Bw/Tw is less than 0.90, the rigidity of the shoulder rib 11s is decreased locally near the tread edge Te, therefore, even if the ratio CB/CC and ratio Rs/Rc are limited, since the rigidity of the shoulder rib 11s becomes uneven, slippage occurs near the tread edge Te and uneven wear is caused. If the ratio Bw/Tw is more than 0.98, the axially outer edge of the maximum width belt ply 9 becomes very close to the tire outer surface BS, therefore, there is a possibility that damage occurs at the axially outer edge of the maximum width belt ply 9 and the durability is decreased.

Owing to the interaction of the limitations of the ratio CB/CC, ratio Rs/Rc and ratio Bw/T, even if the tire is used on the front wheel of a high speed bus, the shoulder wear in the shoulder rib 11s can be controlled at high levels. In view of the above, the ratio CB/CC is preferably not less than 1.00 but not more than 1.06; the ratio Rs/Rc is preferably not less than 1.25 but not more than 1.45; the ratio Bw/Tw is not less than 0.90 but not more than 0.98.

In order to control the shoulder wear in the shoulder rib 11s, preferably, a ply strength index G (=S×E/W) of the maximum width belt ply 9 is limited in a range of from 1.2 to 1.6.

The ply strength index G (=S×E/W) is a ply strength (S×E) divided by the above-mentioned standard tire load W in kN.

The ply strength (S×E) is the product of the tensile rupture strength S in kN of one belt cord and the belt cord count E per 5 cm ply width at a right angle to the belt cords.

If the ply strength index G is less than 1.2, the constraint force of the maximum width belt ply 9 becomes insufficient, and the shoulder rib 11s becomes easy to move, therefore, the shoulder rib 11s is increased in the amount of gross wear and the amount of local wear near the tread edge Te.

If the ply strength index G is more than 1.6, between the axially inside and outside of the edge of the maximum width belt ply 9, the difference in the rigidity and the difference in the constraint force become large. And the amount of local wear near the tread edge Te increases especially. Therefore, the ply strength index G is preferably set in the range of not less than 1.2 but not more than 1.6.

The ply strength index Ga of each the first and third belt plies 7A and 7c is set in a range of from 1.3 to 1.5.

In this embodiment, Ga=G, from the view point of the production efficiency.

FIG. 3 shows a heavy duty radial tire 1B as the second embodiment of the present invention.

The tire 1B is substantially same as the above-mentioned tire 1A except that, in the above-mentioned tread edge near region J, the shoulder rib 11s is provided with a narrow circumferential groove 15 so that the shoulder rib 11s is divided into an axially inner main portion 11s1 and an axially outer narrow portion 11s2, and that the ratio Rs1/Rc of the rib width Rs1 of the shoulder rib main portion 11s1 is limited instead of the ratio Rs/Rc of the rib width Rs of the shoulder rib 11s.

The narrow circumferential groove 15 is a straight groove having a groove width of less than 5 mm and a groove depth of less than that of the circumferential main groove 10s. As to the position of the narrow circumferential groove 15, the area of the top opening of the groove 15 can be wholly or partially included in the tread edge near region J. The narrow circumferential groove 15 has a function to prevent uneven wear starting from the tread edge Te from further spreading axially inwardly beyond the narrow circumferential groove 15 into the main portion 11s1.

It is however, in the case of the front tires of a long-distance highway express bus, due to the severe service conditions, it is difficult to prevent the above-mentioned uneven wear from spreading into the shoulder rib main portion 11s1 and becoming shoulder wear by the narrow circumferential groove 15 only. Therefore, in the second embodiment, instead of the rib width Rs of the shoulder rib 11s, the width Rs1 of the shoulder rib main portion 11s1 is limited within a range of from 1.25 to 1.45 times the rib width RC of the center rib 11c, namely, the ratio Rs1/Rc is limited within the range of from 1.25 to 1.45. Thereby, in cooperation with the limitations of the ratio CB/CC and ratio Bw/Tw, uneven wear in the shoulder rib main portion 11s1 can be controlled at high levels.

Preferably, when measured in the tread surface 2s, the distance L to the narrow circumferential groove 15 from a straight line X drawn perpendicularly to the tread surface 2s passing through the axial edge of the maximum width belt ply 9, is set in a range of from 0 to 5 mm.

If the distance L is more than 5 mm, the shoulder rib main portion 11s1 is decreased in the rigidity on its tread edge side, and slippage is liable to occur in this part, causing uneven wear in the shoulder rib main portion 11s1.

In the above-mentioned tires 1A and 1B of the first and second embodiments, as mentioned above, the tread portion 2 can be provided with a single inner circumferential main groove 10c along the tire equator and two outer circumferential main grooves 10s so that the tread portion 2 is divided into two center ribs 11c and two shoulder ribs 11s as shown in FIGS. 4 and 5.

The invention claimed is:

1. A heavy duty radial tire comprising:
   a tread portion having a tread width (Tw) between tread edges,
   a pair of sidewall portions,
   a pair of bead portions each with a bead core therein,
   a carcass comprising at least one carcass ply made of steel cords extending between the bead portions through the tread portion and sidewall portions, and
   a belt disposed radially outside the carcass in the tread portion and comprising at least two plies of steel cords including a maximum width belt ply,
wherein
   the tread portion is provided with three or four circumferential main grooves extending straight in the tire circumferential direction and having a groove width of not less than 5 mm so that the tread portion is divided into four or five circumferential ribs which are
(A) a pair of axially outer most shoulder ribs, one center rib disposed on the tire equator, and a pair of middle ribs one on each side of the center rib, or
(B) a pair of axially outer most shoulder ribs, and a pair of center ribs disposed one on each side of the tire equator,
   a ratio (Bw/Tw) of a width (Bw) of the maximum width belt ply to the tread width (Tw) is 0.90 to 0.98,
   a ratio CB/CC of a ground contacting length CB to a ground contacting length CC of the contour shape of a footprint of the tire is 1.00 to 1.06, wherein the ground contacting length CB is a circumferential length of the contour shape of the footprint measured at a 70% width position which is defined as being spaced apart from the tire equator by 70% of a half ground contacting width (CTw) which is ½ of the axial width of the contour shape of the footprint, and the ground contacting length CC is a circumferential length of the contour shape of the footprint measured at a 97% width position which is defined as being spaced apart from the tire equator by 97% of the half ground contacting width (CTw),
   in a tread edge near region defined between the tread edge and a plane parallel to the tire equatorial plane positioned at the axial edge of the maximum width belt ply,
(1) the shoulder rib is provided with no circumferential groove having a width of less than 5 mm, and a ratio (Rs/Rc) of an axial width (Rs) of the shoulder rib to an axial width (Rc) of the center rib is 1.25 to 1.45, or
(2) the shoulder rib is provided with a narrow circumferential groove having a width of less than 5 mm to divide the shoulder rib into an axially inner main portion and an axially outer narrow portion, and a ratio (Rs1/Rc) of an axial width (Rs1) of the axially inner main portion to an axial width (Rc) of the center rib is 1.25 to 1.45, and
   the maximum width belt ply has a ply strength index (G =S·E/W) of from 1.2 to 1.6, wherein the ply strength index is a ply strength (S·E) divided by the standard tire load (W) in kN for the tire, and the ply strength (S·E) is the product of the tensile rupture strength (S) in kN of one belt cord and the count (E) of the belt cords per 5 cm width of the ply,
wherein
   said at least two plies of the belt include a radially innermost first ply, a second ply disposed on the radially outside of the first ply, and a third ply disposed on the radially outside of the second ply, and the second ply is said maximum width belt ply, and
wherein
   the ply strength index of each the first and third plies is a range of from 1.3 to 1.5 and same as the ply strength index of the widest second ply.

2. The heavy duty radial tire according to claim 1, wherein a distance measured at the tread surface from a straight line (X) drawn perpendicularly to the tread surface passing through the axial edge of the maximum width belt ply to the narrow circumferential groove provided in the shoulder rib is in a range of from 0 to 5 mm.

\* \* \* \* \*